INVENTOR
W. D. BOYNTON
ATTORNEY

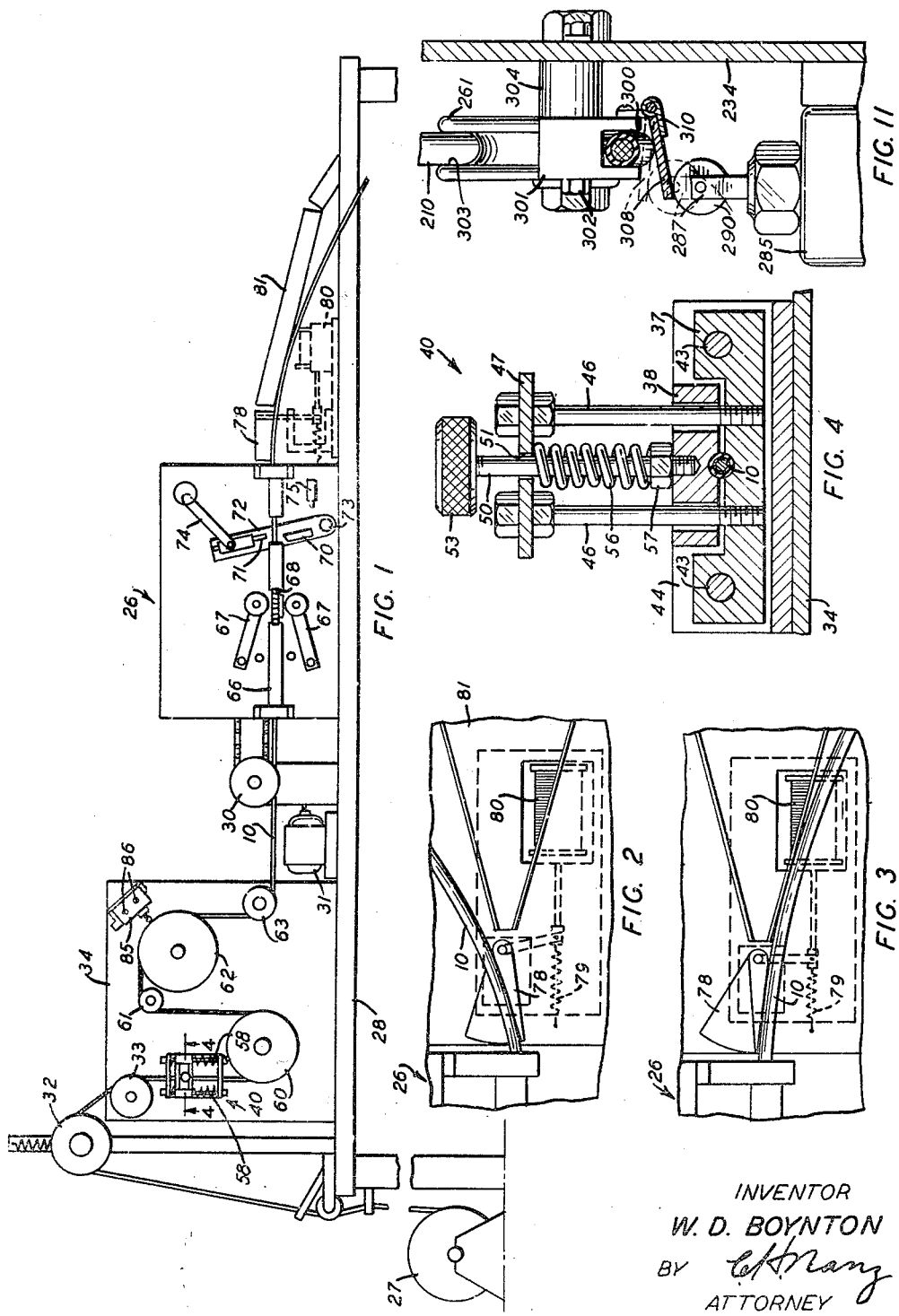

Feb. 8, 1955 W. D. BOYNTON 2,701,471
METHOD OF AND APPARATUS FOR DETECTING STIFF
SECTIONS IN FLEXIBLE FILAMENTS
Filed July 14, 1950 3 Sheets-Sheet 3

INVENTOR
W. D. BOYNTON
BY
ATTORNEY

United States Patent Office 2,701,471
Patented Feb. 8, 1955

2,701,471

METHOD OF AND APPARATUS FOR DETECTING STIFF SECTIONS IN FLEXIBLE FILAMENTS

Wentworth D. Boynton, Baltimore, Md., assignor to Western Electric Company, Incorporated, New York, N. Y., a corporation of New York Application July 14, 1950, Serial No. 173,905

6 Claims. (Cl. 73—160)

This invention relates to methods of and apparatus for detecting stiff sections in flexible filaments, and more particularly to methods of and apparatus for detecting stiff splices in flexible insulated conductors.

In the manufacture of certain types of multi-conductor flexible cordage for use in communication devices, the individual conductors of the cordage include a plurality of tinsel threads twisted together, a textile covering and insulating coverings of rubber, or rubber like material. A plurality of such insulated tinsel conductors are enclosed in a textile jacket or an extruded jacket of insulating material to form multi-conductor cordage which is advanced through apparatus designed to cut the cordage into cords of predetermined equal lengths. Successive lengths of the textile covered tinsel cores must be spliced together to maintain in substantially continuous operation the apparatus used in twisting the tinsel cores. Also, successive lengths of the insulated tinsel conductors must be spliced together to maintain the apparatus which extrudes the jacket around the grouped conductors in continuous operation.

The splice, in either case, includes a stiff tubular member which is clamped on the ends of the tinsel cores, and is designed to pass through the apparatus which extrudes the insulating covering on the tinsel cores. The splice is enclosed in the jacket and forms a stiff section in the cordage without producing an enlargement in the diameter of the conductor, or the cordage in which the conductor is included, and does not connect the successive lengths of the conductors electrically. As a result, the cords which contain the splices must be discarded. Since the splices do not form any enlargement in the diameter in the individual conductor or the diameter of the cordage, the conventional type of detectors which are operable by an enlargement in the article, cannot be used, and it is very laborious to locate the splices by testing each cord cut from such cordage. Heretofore, there has been no device for detecting such splices in flexible cordage operable by the stiff section produced in the cordage by the splice.

An object of the invention is to provide new and improved methods of and apparatus for detecting stiff sections in flexible filaments.

Another object of the invention is to provide new and improved methods of and apparatus for detecting stiff splices in insulated conductors.

A method of detecting stiff sections in filaments in accordance with certain features of the invention, comprises flexing all portions of a filament to bend permanently any stiff section therein so that a portion of the stiff section extends laterally beyond the flexible portion of the filament, and detecting the said bent portions which extend beyond the flexible portions of the filament to locate the stiff section in the filament.

An apparatus embodying certain features of the invention may include means for flexing all portions of a flexible filament to bend permanently a stiff section therein so that a portion thereof extends beyond the flexible portion of the filament, and means operable by the bent section for locating the stiff section in the filament.

Other objects and advantages of the invention will appear from the following detailed description of a method and apparatus forming specific embodiments thereof, when read in conjunction with the appended drawings, in which:

Fig. 1 is an elevation of a slitting and cutting machine provided with a detector embodying certain features of the invention;

Fig. 2 is a plan view of the portion of the apparatus shown in Fig. 1;

Fig. 3 is identical with Fig. 2 but having some of the parts moved to different operating positions;

Fig. 4 is a vertical section taken along line 4—4 of Fig. 1;

Fig. 11 is a vertical section taken along line 8—8 of Fig. 7.

Figures 7, 8:
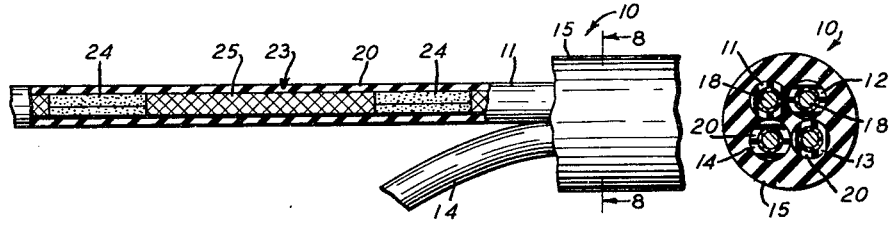
Fig. 7 is a plan view of a portion of one type of multi-conductor cordage and having portions thereof broken away for reasons of clarity.
Fig. 8 is a transverse section taken along line 8—8 of Fig. 7.

Referring now in detail to the drawings, and more particularly to Fig. 7 which shows a portion of a multi-conductor cordage 10 having insulated conductors 11, 12, 13 and 14 enclosed in a tough, elastic jacket 15 composed of vulcanized rubber or rubber-like compounds or various organic plastic compounds that may be cured into a tough elastic covering by application of heat and pressure. The conductors 11, 12, 13 and 14 are identical in construction, each of which comprises a flexible metallic core 18 enclosed in an insulating covering 20. During the process in which the jacket 15 is extruded around the conductors, successive lengths of the conductors are spliced together by a splice 23 to maintain the extruding apparatus in continuous operation for sustained periods.

The splice 23 comprises tubular metal tins 24—24 joined together by a flexible band 25 which may be made in the form of a textile strand. The tubular tips 24—24 clamped on the ends of the cores are designed to pass through the extruding apparatus, and are enclosed in the jacket 15 without making any enlargement in the diameter of the cordage 10. The tips 24—24 form stiff sections in the cordage, and the band 25 interrupts the electrical continuity of the metallic core of the conductors. Therefore, the splice 23 must be detected and the portions of the cordage containing the splice must be discarded.

An apparatus embodying certain features of the present invention for detecting splices like the splice 23 in flexible cordage is shown in Fig. 1 in conjunction with a cord slitting and cutting machine 26 designed to cut the cordage 10 into cords of predetermined equal length. A reel 27 containing a supply of the cordage 10 is positioned in the left-hand end of a table 28 supporting the cord slitting and cutting machine 26. A capstan 30 driven by a motor 31 advances the cordage 10 from left to right, as viewed in Fig. 1, at a predetermined rate. The advancing cordage travels around a spring-loaded sheave 32 and around a guide sheave 33 mounted on a fixed plate 34 secured to the table 28. The sheave 33 guides the cordage 10 downwardly between a pair of shoes 37 and 38 forming part of a tensioning device 40 (Figs. 1 and 4) secured on the plate 34.

The shoe 37 (Fig. 4) is mounted slidably on parallel rods 43—43 positioned spacedly in a U-shaped support 44 fixed to the plate 34. The shoe 38 is mounted slidably on the parallel posts 46—46 secured perpendicularly to the shoe 37 and having a plate 47 secured on the free ends thereof. A post 50 secured to the shoe 38 between the posts 46—46, extends through a bore 51 of the plate 47 and has a knurled knob 53 on the free end thereof. A compression spring 56 positioned over the rod 50 between the plate 47 and a nut 57 threadedly mounted on the post 50 urges the shoe 38 toward the shoe 37 to exert a frictional drag on the cordage 10 passing between the shoes. Compression springs 58—58 positioned over the rods 43—43 oppose movement of the shoes 37 and 38 in the direction of travel of the cordage 10 and exert a reverse pull on the cordage 10. This pull on the cordage coacts with the frictional drag exerted on the cordage by the shoes 37 and 38 to maintain a substantially uniform tension on the cordage. The nut 57 is threaded toward or away from the shoe 38 to obtain a predetermined tension in the cordage between the tensioning device 40 and the capstan 30.

Figure 5:
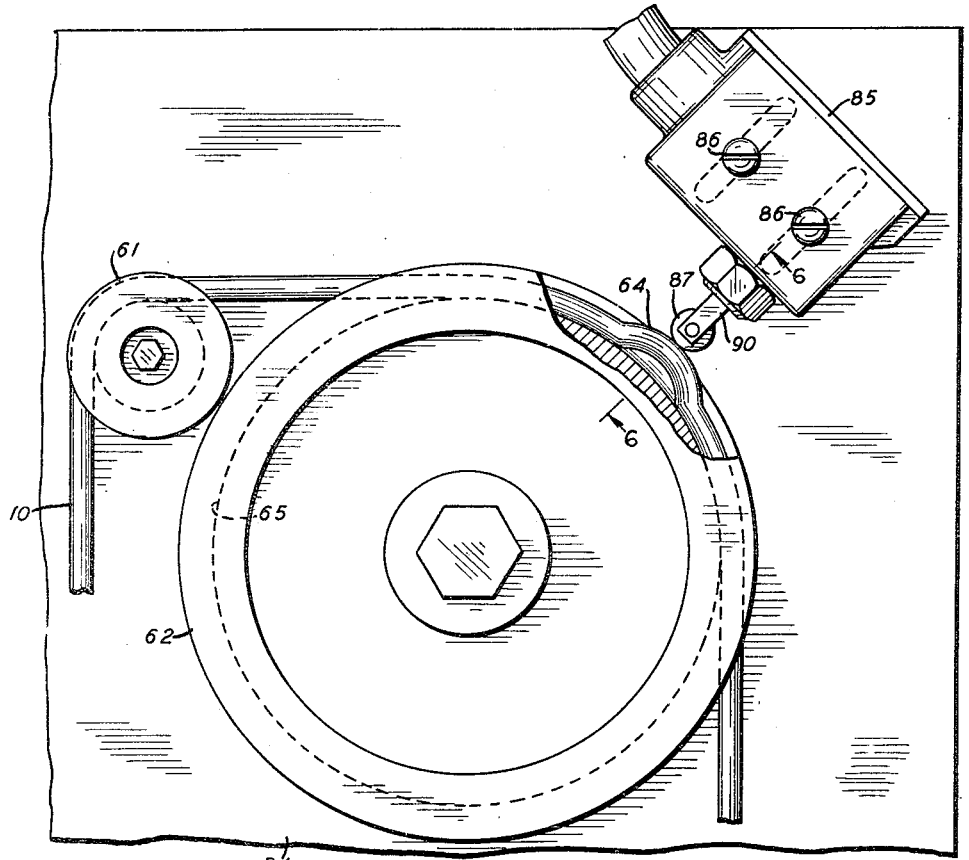
Fig. 5 is an enlarged elevation of the detector shown in Fig. 1.

The cordage 10 travels from the tensioning device 40 around a sheave 60 (Figs. 1 and 5) and then upwardly and around a small bending sheave 61 mounted on the plate 34 and having a peripherial groove designed to fit snugly over the cordage 10. The cordage travels from the sheave 61 to the right and around a large detector sheave 62 to a sheave 63 which guides the cordage to the capstan 30. The bending sheave 61 is designed to have a radius which provides a very sharp turn for the tips 24—24 of the splice. The spring 56 of the tensioning device 40 is adjusted to apply a frictional drag on the cordage sufficient to form the tubular tips 24—24 around the periphery of the bending sheave 61 so as to leave a permanent bend 64 in the cordage, as seen in Fig. 5. The sheave 62 is substantially large in diameter than the sheave 61 and has a peripherial groove 65 designed to fit neatly over the cordage 10 and thereby hold the bend 64 in the same position in which it was formed around the bending sheave, in which case a portion of the bend extends outwardly from the normal path of travel of the cordage around the sheave 62.

After passing around the capstan 30 several times, the cordage travels through a guide tube 66, between slitting discs 67—67 and between a pair of driven sheaves, one of which is shown on the drawings and indicated by the numeral 68. The driven sheaves 68—68 hold the cordage between the discs 67—67 and also push the cordage to the right between a stationary shear blade 70 and a reciprocable shear blade 71 mounted on an arm 72. The arm 72 is keyed to a shaft 73 of the cutting machine 26 which is oscillated by the motor 31 at periodic intervals. The oscillations of the shaft 73 turns the arm 72 in a clockwise direction, and an arm 74 mounted pivotally on the machine 26 urges the blade 71 downwardly so as to cut the cordage 10 into cords whose length is determined by the speed of operation of the arm 72 and the rate of advancement of the cordage.

A more detailed description of the construction and operation of the cord slitting and cutting machine 26 may be found in Patent 2,319,198 granted to W. T. Barrens et al., May 18, 1943. Consequently, the slitting machine 26 has been described only insofar as it is necessary for a complete understanding of the present invention.

Figure 9:
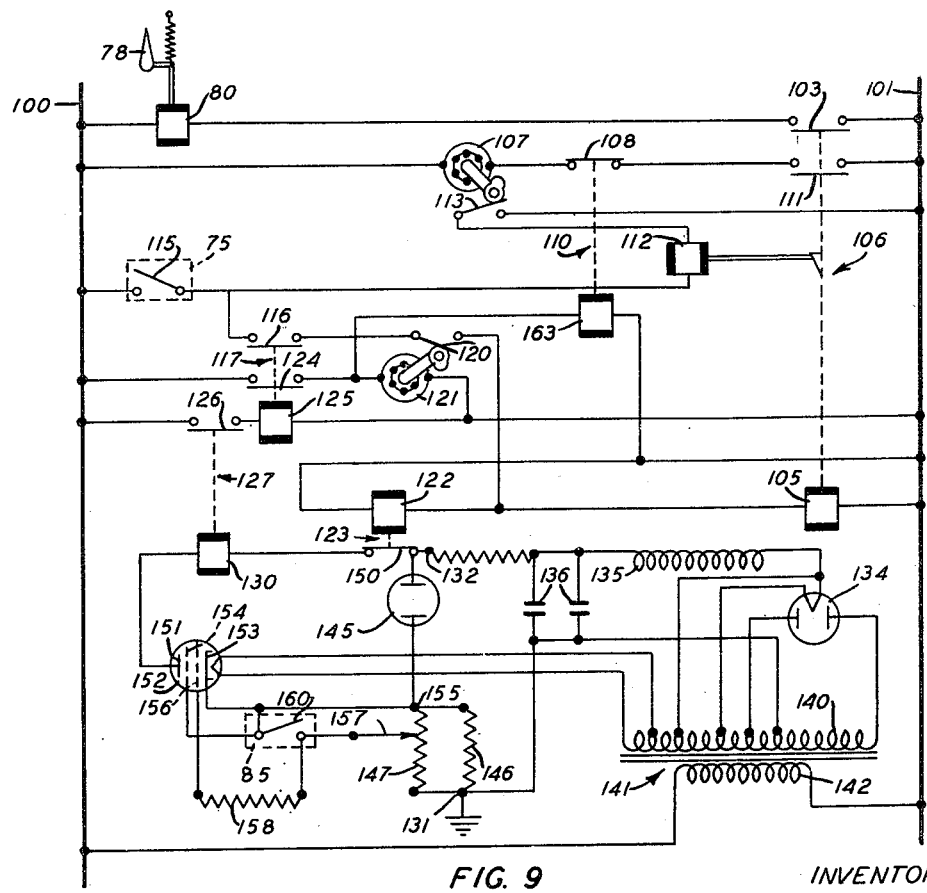
Fig. 9 is a schematic wiring diagram of the electrical apparatus associated with the detector and cutting machine shown in Fig. 1.

A sensitive switch 75 (Fig. 1), actuated by the arm 72 each time it moves in a clockwise direction to cut the cordage 10 into cords, is connected electrically to the apparatus shown in Fig. 9 to control the position of a cord-deflecting vane 78 positioned at the right hand end of the machine 26 and operated by a solenoid coil 80. The vane 78 is held normally in the position shown in Fig. 2 by a tension spring 79. The cordage 10 advances from the blades 70 and 71 past the vane 78, which is positioned normally as shown in Fig. 2, and slides across the right hand side of a V-shaped guide 81 positioned on the table. The cords cut from the cordage slide from the right hand side of the guide 81 into a suitable receptacle (not shown) positioned on the floor. The vane 78 is operable to a position shown in Fig. 3, in a manner hereinafter to be described, to deflect the cut cords containing splices 23—23 to the left side of the guide 81 from which the cut length falls into a receptacle (not shown) provided for defective cords.

The apparatus for detecting the splices 23—23 in the cordage 10 includes a sensitive switch 85 mounted adjustably on the plate 34 by screws 86—86. The switch is positioned on the plate 34 so that a roller 87 mounted on its operating arm 90 is adjacent to the surface of the cordage 10 as it travels in the groove 65 of the sheave 62. When a bend 64 formed by the sheave 61 passes around the sheave 62 (Fig. 5), a portion of the bend travels outside the normal path of travel of the cordage around the sheave. The protruding portion of the bend 64 strikes the roller 87 and depresses the operating arm 90 of the sensitive switch 85. This operation of the switch 85 is used to position the vane 78 in a manner hereinafter to be described, so that cords cut from the cordage containing the splice will be directed to the left side of the guide 81.

Referring now to Fig. 9, busses 100 and 101 are connected to a suitable source of A. C. potential (not shown). The solenoid coil 80, which controls the position of the vane, is connected across the busses 100 and 101 in series with a normally open contact 103 operated by an operating coil 105 of a relay 106. A timer motor 107 is connected across the busses 100 and 101 in series with a normally closed contact 108 of a relay 110 and a normally open contact 111 provided on the relay 106. The relay 106 is provided with a mechanical latch 109 for holding the relay closed, and a reset coil 112 for releasing the latch is connected across the busses in series with a normally open contact 113 arranged to be closed by the timer motor 107 upon the expiration of a predetermined period of time and a normally open contact 115 of the sensitive switch 75. The operating coil 105 of the relay 106 is connected across the busses in series with a normally open contact 115 of the switch 75, a normally open contact 116 of a relay 117 and a normally open contact 120 operable by a timer motor 121. An operating coil 122 of a relay 123 also is connected across the busses in series with the contacts 115, 116 and 120.

The timer motor 121 is connected across the busses 110 and 111 in series with a normally open contact 124 of the relay 117, and the operating coil 125 of the relay 117 is connected across the busses in series with a normally open contact 126 of a sensitive relay 127. An operating coil 130 of the relay 127 is arranged to operate on a D. C. potential supplied to terminals 131 and 132 by a full-wave rectifier 134 and a filter circuit including an inductance 135 and condensers 136—136. The plates and filament of the rectifier tube 134 are connected across portions of a tapped secondary winding 140 of a transformer 141 having its primary winding 142 connected across the busses 100 and 101. A voltage regulating vacuum tube 145 is connected across the terminals 131 and 132 in series with a parallel circuit including a resistor 146 and a potentiometer winding 147 to maintain the voltage across the terminals 131 and 132 substantially constant.

One side of the coil 130 is connected to the D. C. terminal 132 in series with a normally closed contact 150 of the relay 122, and the other side of the coil 130 is connected to a plate 151 of a thyratron tube 152. A cathode 153 and a control grid 154 are connected together and to a common terminal 155 between the tube 145 and the potentiometer winding 147. A second control grid 156 of the tube 152 is connected to an arm 157 which engages the potentiometer winding 147 in series with a resistance 158. The arm 91 (Fig. 5) of the switch 85 is arranged to operate a normally open contact 160 (Fig. 9) thereof which is connected across the grids in series with the resistance 158. The potentiometer arm 157 is adjusted on the winding 147 so that the potential on the grid 156 is negative with respect to the filament and renders the tube non-conductive when the contact 160 is open. When the contact 160 is closed, the grid 156 becomes more positive with respect to the filament 153, whereupon the thyratron tube 152 fires and connects the coil 130 across the terminals 131 and 132. The tube 152 continues to fire and maintain the coil 130 energized after the switch 160 opens, because the gas in the tube ionizes and makes the tube conductive between the filament 153 and the plate 151 even though the grid 156 is more negative than the grid 154. The tube 152 remains conductive until the plate circuit is interrupted and current ceases to flow through the tube. An operating coil 163 of the relay 110 is connected across the busses 100 and 101 in series with the normally open contact 124 of the relay 117.

*Operation of embodiment shown in Figs. 1 to 9, inclusive*

The capstan 30 (Fig. 1) advances the cordage 10 through the tensioning device 40 and around the bending sheave 61 to the driven sheaves 68—68 which in turn push the cordage through the shear blades 70 and 71 of the machine 26. The motor 31 is arranged to actuate the slitting devices 67—67 at periodic intervals to slit the jacket 15 on opposite sides thereof. As the slitted portion of the cordage passes between the blades 70 and 71, the motor turns the shaft 73 in a clockwise direction which moves the arm 72 to the right and causes the blade 71 to slide downwardly and sever the cordage into cords of predetermined equal length. The cordage 10 is cut in the center of the slitted portion so that each end of the cords has a portion of the jacket 15 slitted on opposite sides so that the jacket may be stripped from the ends of the cord to expose the individually insulated conductors 11, 12, 13 and 14.

The cordage 10 is advanced continuously through the cutting and slitting machine 26, and non-defective cords cut therefrom are deflected by the vane 78 to the right side of the guide 81, as viewed in Fig. 2. The arm 72 actuates the switch 75 and closes its normally open contact 115 each time the cordage is cut by the blades 70 and 71, but closure of the contact 115 does not effect the operation of any of the electrical apparatus shown in Fig. 9 because the contacts 116 and 120 are open. The switch 85 (Fig. 5) is adjusted on the plate 34 so that portions of the cordage having no splices therein in passing around the sheave 62 do not move the arm 87 and actuate the contact 160 of the switch 85.

When a portion of the cordage 10 containing a splice 23 in any one of the conductors 11, 12, 13 or 14 passes around the bending sheave, the tension in the cordage forms the tips 24—24 of the splice around the periphery of the sheave 61, into a permanent bend 64 in the cordage. When the bend 64 passes around the detector sheave 62, the groove 65 holds the bend so that it protrudes beyond the normal path of travel of the cordage around the sheave. The bend strikes the roller 87 and depresses the operating arm 90 of the switch 85 and closes the normally open contact 160 of the switch. Closure of the contact 160 shorts out the resistance 158 and renders the tube 152 conductive whereupon the tube fires and connects the coil 130 of the relay 127 across the D. C. terminals 131 and 132 in series with the normally closed contact 150. The coil 130 is energized and closes its normally open contact 126 which connects the coil 125 of the relay 117 across the busses 100 and 101. Energization of the coil 125 closes its normally open contacts 116 and 124 which connect the timer motor 121 and the coil 163 of the relay 110, respectively, across the busses 100 and 101. The tube 162 continues to fire after the bend 64 passes around the sheave 62 and allows the contact 160 of the switch 85 to open, and the contact 126 remains closed as long as the tube fires.

When the timer motor 121 completes a predetermined timing cycle, it closes its normally open contact 120 and holds it closed until the timer motor is deenergized. The timing period of the motor 121 is adjusted to delay the operation of the vane 78 after a splice closes the contact 160 until a portion of the cordage positioned between the sheave 61 and the blades 70 and 71 sufficient to make up a cord length passes through the blades 70 and 71. As a result, the arm may cut the cordage 10 one or more times and close the contact 115 one or more times before the timing motor 121 completes its timing cycle and closes its contact 120. The timing period of the motor 121 depends on the linear distance between the detector sheave 61 and the blades 70 and 71, the linear speed of the cordage and the desired length of the cords to be cut from the cordage.

The first closure of the contact 115 by the arm 72, after both the contacts 116 and 120 are closed energizes the coils 105 and 123 which close the contacts 103 and 111 of the relay 106 and opens the contact 150. Closure of the contact 103 energizes the coil 80 which turns the vane 78 to its position shown in Fig. 3, and the closure of the contact 111 starts the timer motor 107 because the prior opening of the contact 150 deenergized the relays 127, 117 and 110 and reclosed the contact 108. The relay 117 is provided with means for delaying the opening of its contact 115 for a period of time sufficient to permit the relay 106 to close. The relay 106 latches in its closed position so that its contacts 103 and 111 remain closed after the relays 117 and 127 are deenergized.

The vane 78 now directs the cordage to the left side of the guide 81 so that the cords containing the splice 23 will be separated from the good cords. The vane 78 remains in this position until the splice passes the blades, at which time the timer motor 107 completes its timing cycle and closes its contact 113 whereupon the next closure of the contact 115 energizes the reset coil 112 to release the relay 106 to its open position. Opening of the contacts 103 and 111 of the relay 106 deenergizes the coil 80, whereby the spring 79 returns the vane to its normal position, and deenergizes the timer motor 107 so that it may reset to its starting position, respectively. Each splice in the cordage is bent in the manner described and causes the vane 78 to be turned in the manner described for a period of time sufficient to discard a sufficient number of cords to include the splice which caused the movement of the vane.

*Alternate embodiment*

Figure 10:
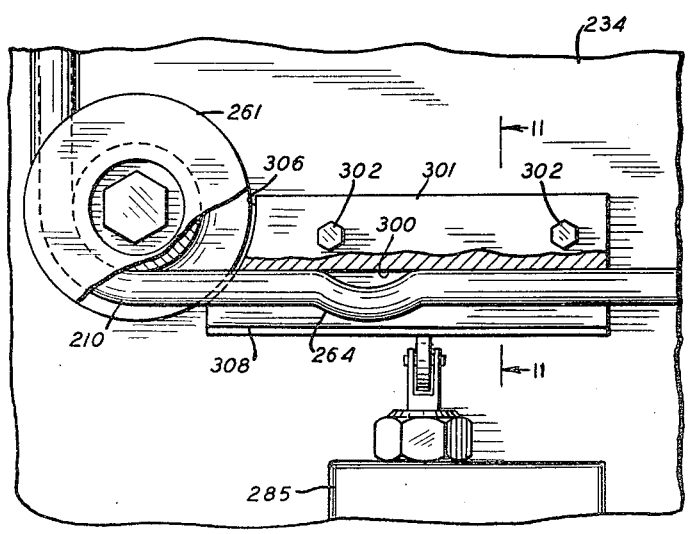
Fig. 10 is an elevation of a detector forming an alternate embodiment of the invention.
Figure 6:
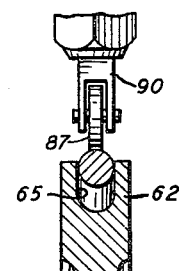
Fig. 6 is a fragmentary vertical section taken along line 6—6 of Fig. 5.

Figs. 10 and 11 show a splice detector forming an alternate embodiment of the invention which may be used with a cord slitting and cutting machine like the machine 26 shown in Fig. 1, and with associated electrical apparatus like that shown in Fig. 9. It is to be understood that the cordage 210 which is identical with the cordage 10, travels through a tensioning device (not shown) like the device 40 to a bending sheave 261 mounted rotatably on a plate 234 in the position occupied by the sheave 63 described in the principal embodiment of the invention. The cordage 210 passes from the bending sheave 261 through an elongated guideway 300 formed in a bar 301 secured to the plate 234 by bolts 302—302. The bar 301 is supported on a spacer 304 so that its guideway 300 is aligned with a groove 303 in the periphery of the bending sheave 261 when viewed in Fig. 11. The end of the bar 301 adjacent to the detector sheave 261 has a curved portion 306 so that the guideway may be positioned close to the periphery of the detector sheave.

A plate 308 (Fig. 11) is mounted pivotally on the underside of the bar 301 by a hinge 310 (Fig. 11) so that the free end of the plate rests on the roller 290 positioned on the end of an operating arm 287 of a sensitive switch 285. The switch 285 is secured adjustably on the plate 234 so that the arm 287 holds the plate 308 in a substantially horizontal position. The guideway 300 in the bar 301 is of such width that it fits closely over the cordage 210 and is of such depth that the surface of the cordage is close to the inner surface of the plate 308. The tension in the cordage 210 is adjusted to deform the tubular tips of a splice in any of the individual conductors of the cordage 210 around the detector sheave 261 into a permanent bend in the cordage.

The clearance between the plate 308 and the cordage 10 is such that when the bend 264 passes through the guideway 300, it moves the plate downwardly and depresses the arm 287 of the switch 285. The switch 285 is provided with a normally open contact which is connected to electrical apparatus like that shown in Fig. 9 in the same manner as that described for the contact 160 of the principal embodiment of the invention.

*Operation of alternate embodiment*

Except for the apparatus shown in Figs. 10 and 11, the operation is identical with that of the apparatus shown in Figs. 1 to 9, inclusive. When any one of the conductors in the cordage 210 contains a splice, like the splice 23 shown in Fig. 7, the tension in the cordage forms the tubular metal tips of the splice around the detector sheave 261 into a permanent bend 264 in the cordage. The bend 264 actuates the switch 285 and sets associated electrical apparatus like that shown in Fig. 9 in operation to position the cord-directing vane located at the end of the cutting and slitting machine so that it diverts the cordage containing splices from the normal path of travel of the cordage. Each tubular metal tip of the splice forms a bend 264 in the cordage 210 which actuates the switch 285 in the manner described.

While the above-described apparatus is particularly well adapted for detecting stiff tubular splices in insulated conductors and jacketed cordage, it may be readily modified for detecting stiff sections or imperfections in various types of filaments without departing from the spirit and scope of the invention.

What is claimed is:

1. An apparatus for detecting stiff, permanently deformable sections in continuously advancing filamentary articles, which comprises a sheave for turning the article around a radius sufficiently small to permanently bend any stiff section in the article so that said bent section extends beyond the normal path of travel of the article, an elongated member having a substantially straight passageway for holding the bent stiff section in the same plane in which it was formed around the sheave, a detecting element pivotally mounted on the member and positioned adjacent to the path of the article so as to be actuated by the extending portion of the bent stiff section as it passes through the passageway, and means operated by the movement of the detecting element for detecting the presence of the stiff section in the filamentary article.

2. An apparatus for detecting stiff, permanently deformable sections in a continuously advancing flexible filament, which comprises a small sheave for turning the advancing filament around a radius sufficiently small to bend permanently any of such stiff sections in the filament, a second sheave having a substantially larger radius than said first-mentioned sheave about which the filament is subsequently advanced whereby the permanently bent, stiff sections of the filament protrude substantially beyond the normal path of travel of said filament advancing around said second sheave, and a feeler positioned adjacent to said path of travel of the filament around the second sheave so as to be engaged by and to detect the protruding, permanently bent sections thereof.

3. The method of detecting stiff, permanently deformable sections in flexible filaments, which comprises bending all portions of the filament to an extent such that only such stiff sections therein are permanently deformed so that the stiff sections extend substantially laterally of the normal longitudinal axis of the flexible portions of the filament when said filament is straightened, straightening the flexible portions of the filament under a tension insufficient to straighten the stiff sections, and then detecting the portions extending substantially laterally of the normal longitudinal axis of the flexible portions of the filament to locate the stiff sections in the filament.

4. An apparatus for detecting a stiff, permanently deformable section in a continuously advancing, otherwise flexible filament, which comprises a small sheave for turning the advancing filament around a radius sufficiently small to bend permanently only the stiff section in the filament, guide means for subsequently causing the filament to traverse a path having a radius of curvature substantially larger than the radius of said first-mentioned sheave whereby the permanently bent section of the filament protrudes substantially beyond the normal path of travel of said filament advancing along said guide means, and a feeler positioned adjacent to said path of travel of the filament through the guide means so as to be engaged by the protruding, permanently bent section and to detect said bent section.

5. An apparatus for detecting a stiff, permanently deformable section in a continuously advancing flexible filament, which comprises guide means for causing such a filament to traverse an arcuate path having a radius of curvature sufficiently small to bend permanently only the stiff section in the filament, a second guide means through which the filament is subsequentially advanced for causing said filament to traverse a path having a radius of curvature substantially larger than the radius of curvature of said first-mentioned guide means whereby the permanently bent section of the filament protrudes substantially beyond the normal path of travel of said filament advancing along said second guide means, and a feeler positioned adjacent to said path of travel of the filament through the second guide means so as to be engaged by and to detect the protruding permanently bent section.

6. The method of detecting splices in flexible tinsel cordage having a core made of successive lengths of insulated tinsel conductors joined together by splice elements including permanently deformable metallic bands and a protective jacket surrounding the spliced conductor and the splicing elements, which comprises the steps of bending all portions of the cordage around such a short radius that the metallic bands are permanently deformed causing the cordage to be kinked at each such deformed band, tensioning the cordage sufficiently to straighten only the flexible portion thereof, and then detecting the kinked portions of the cordage to locate the positions of the deformed metallic bands.

References Cited in the file of this patent

UNITED STATES PATENTS

| 2,243,842 | Fearn | June 3, 1941 |
| 2,469,608 | Phillimore | May 10, 1949 |
| 2,491,228 | Swift | Dec. 13, 1949 |

FOREIGN PATENTS

| 3,659 | Great Britain | 1880 |